United States Patent
Peng et al.

(10) Patent No.: US 11,727,858 B2
(45) Date of Patent: Aug. 15, 2023

(54) DISPLAY DRIVER IC (DDIC) BACKPLANE FOR SCANNING MICROLED ARRAY

(71) Applicant: AuroraTech Company, San Francisco, CA (US)

(72) Inventors: Ziqi (Kelly) Peng, San Francisco, CA (US); Eric Schmid, Foster City, CA (US)

(73) Assignee: Auroratech Company, San Francisco, CA (US)

( * ) Notice: Subject to any disclaimer, the term of this patent is extended or adjusted under 35 U.S.C. 154(b) by 0 days.

(21) Appl. No.: 17/203,679

(22) Filed: Mar. 16, 2021

(65) Prior Publication Data

US 2021/0225268 A1    Jul. 22, 2021

Related U.S. Application Data

(63) Continuation-in-part of application No. 17/117,057, filed on Dec. 9, 2020, now Pat. No. 11,514,828, which is a continuation-in-part of application No. 16/708,391, filed on Dec. 9, 2019, now Pat. No. 11,221,486.

(60) Provisional application No. 62/990,401, filed on Mar. 16, 2020, provisional application No. 62/853,092, filed on May 27, 2019, provisional application No. 62/777,689, filed on Dec. 10, 2018, provisional application No. 62/777,699, filed on Dec. 10, 2018.

(51) Int. Cl.
*G09G 5/10*     (2006.01)
*G09G 3/32*     (2016.01)
*G02B 27/01*    (2006.01)

(52) U.S. Cl.
CPC ........... *G09G 3/32* (2013.01); *G02B 27/0172* (2013.01); *G09G 5/10* (2013.01); *G09G 2320/0626* (2013.01); *G09G 2380/00* (2013.01)

(58) Field of Classification Search
None
See application file for complete search history.

(56) References Cited

U.S. PATENT DOCUMENTS

| | | | |
|---|---|---|---|
| 2016/0104453 A1* | 4/2016 | Borenstein | H04N 23/11 348/62 |
| 2017/0127120 A1* | 5/2017 | Phang | H04N 21/8547 |
| 2019/0347981 A1* | 11/2019 | Horowitz | G09G 3/346 |
| 2020/0226989 A1* | 7/2020 | Ferguson | G09G 3/3648 |
| 2020/0403117 A1* | 12/2020 | Fabien | G09G 3/3233 |
| 2022/0102583 A1* | 3/2022 | Baumheinrich | G09G 3/32 |

* cited by examiner

*Primary Examiner* — Amr A Awad
*Assistant Examiner* — Bocar V Bocar
(74) *Attorney, Agent, or Firm* — Smith Tempel Blaha LLC; Gregory Scott Smith

(57) ABSTRACT

A 1D scanning micro-display architecture for high-resolution image visualization in compact AR and Head Mounted Displays ("HMDs"). A display driver is configured to drive a plurality of display pixels of a tri-linear microdisplay, wherein the tri-linear microdisplay defines one or more stripes. Each of the stripes are constructed of one or more rows of pixels, and is used in the 1D-scanning display system to create high-resolution images in an augmented reality ("AR") or Head Mounted Display.

27 Claims, 6 Drawing Sheets

DISPLAY DRIVER IC (DDIC) BACKPLANE FOR SCANNING MICROLED ARRAY

BACKGROUND

Presently, extreme high-resolution and high-brightness micro-displays for Augmented Reality ("AR") applications are not currently available in the industry. Further, any anticipatory development of such extreme high-resolution and high-brightness micro-displays are expected to be large in size and expensive to manufacture. These short-comings are due, among other things, to the difficulty of integrating large, defect-free, monolithic color RGB microLED (light emitting diodes) displays.

The traditional approaches to microLED displays include a two dimensional (2D) arrangement of RGB micro-led pixels. In this approach, each physical pixel represents a pixel of the displayed image (i.e., there is a 1:1 mapping). Each pixel row is updated sequentially as the image frame data is transferred to the display driver IC (DDIC). Pixel data usually needs to be buffered for only one row period prior to pixel update. For use in a AR application, such as a headset, the number of microLEDs required to construct a 2D display directly impacts the size and manufacturing cost of the headset.

There is a need on the art for a solution that would allow the benefits of microLEDs in an AR application to be realized, but that would reduce the size and manufacturing cost of the AR application.

SUMMARY

The various embodiments are directed toward the utilization of a tri-linear microdisplay for use within a augmented reality AR headset or in other applications. In an exemplary embodiment, an apparatus includes a display driver configured to drive a plurality of display pixels of a tri-linear microdisplay. The tri-linear microdisplay defines one or more stripes, wherein each of the one or more stripes has one or more rows of pixels. The tri-linear microdisplay is then utilized within a 1D-scanning display system to create high-resolution images in an augmented reality ("AR") or Head Mounted Display.

In some embodiments, the display driver is further configured to present one or more sub-bands of a particular image on one or more of the stripes of the tri-linear microdisplay. Further, the sub-bands can also be time-shifted. In some embodiments, the display driver utilizes one or more first in first out ("FIFO") memory blocks to create the one or more time-shifted sub-bands of the particular image for the one or more stripes.

Even further, the display driver in various embodiments may operate to cause lines of the particular image to scroll through each of the one or more stripes row by row at a display line rate. This task, as a non-limiting example, can be performed utilizing a pipeline data update architecture in which data for each of the plurality of pixels in the tri-linear microdisplay propagates from an adjacent pixel in a neighboring row.

In some embodiments, the display driver is configured to achieve a grayscale pixel illumination by shifting the particular image through multiple rows such that the resulting perceived pixel illumination is the sum of the pixel intensities from the corresponding pixels in each row. In such embodiments, the pixel intensity modulation can be achieved by a distributed pulse width modulation ("PWM") method wherein each row is driven with fixed gain level and a global row clock, and wherein pixel data is updated by decrementing and propagating to the adjacent row. Alternatively, in such embodiments, the pixel intensity modulation can be achieved by driving each pixel proportional to a desired intensity value, and pixel data is updated by propagating the same desired intensity value to an adjacent row. Even further, in such embodiments, the pixel intensity modulation can be achieved by driving each pixel with a pulse width proportional to a desired intensity value, and pixel data is updated by propagating a related intensity value to the adjacent row.

In yet other embodiments, the display driver can be configured to reduce an effect of physical LED non-uniformity by illuminating certain pixels in multiple rows at an appropriate time such that the illumination of each certain pixel sums to create an aggregate brightness of an individual display pixel.

In yet even further embodiments, pixel driver circuits within the display driver can be configured to reduce the effect of 1D-scanner motion pixel blur by illuminating each row for less than 100% of an image row display time.

In yet even further embodiments, pixel driver circuits within the display driver comprise a fast switch capable of a high drive current and constructed such that a performance characteristic of the fast switch will not degrade over a useful life of the AR or Head Mounted Display.

In some embodiments, the display driver may include one or more of the following elements:
 (a) a microLED drive transistor,
 (b) a current mirror,
 (c) a digital memory,
 (d) a digital latch,
 (e) a one-time programmable ("OTP") or electronically erasable programmable read only memory ("EEPROM"),
 (f) a programmable fuse,
 (g) a ripple decrement circuit,
 (h) a voltage follower amplifier,
 (i) a digital-to-analog ("DAC"), and
 (j) a comparator.

In the various embodiments, the display driver may include an adjustable row clock timer such that the display driver can adjust the timing to compensate for non-linearities of an optical scanner and/or an optical system.

In the various embodiments, the display driver may include a pixel illumination circuit and/or a row update circuit that are synchronized to the position of an optical scanner.

In the various embodiments, the display driver may be configured to cause the particular image to shift locations across a physical array of pixels to align to an interpupillary distance ("IPD") of a current user.

These afore-described embodiments, as well as methods of performing the actions are further described in connection with the figures and the detailed description.

DETAILED DESCRIPTION OF THE VARIOUS EMBODIMENTS

The present invention, as well as features and aspects thereof, is directed towards providing a 1D scanning microdisplay architecture for high-resolution image visualization in compact AR and Head Mounted Displays ("HMDs").

Figure 4:
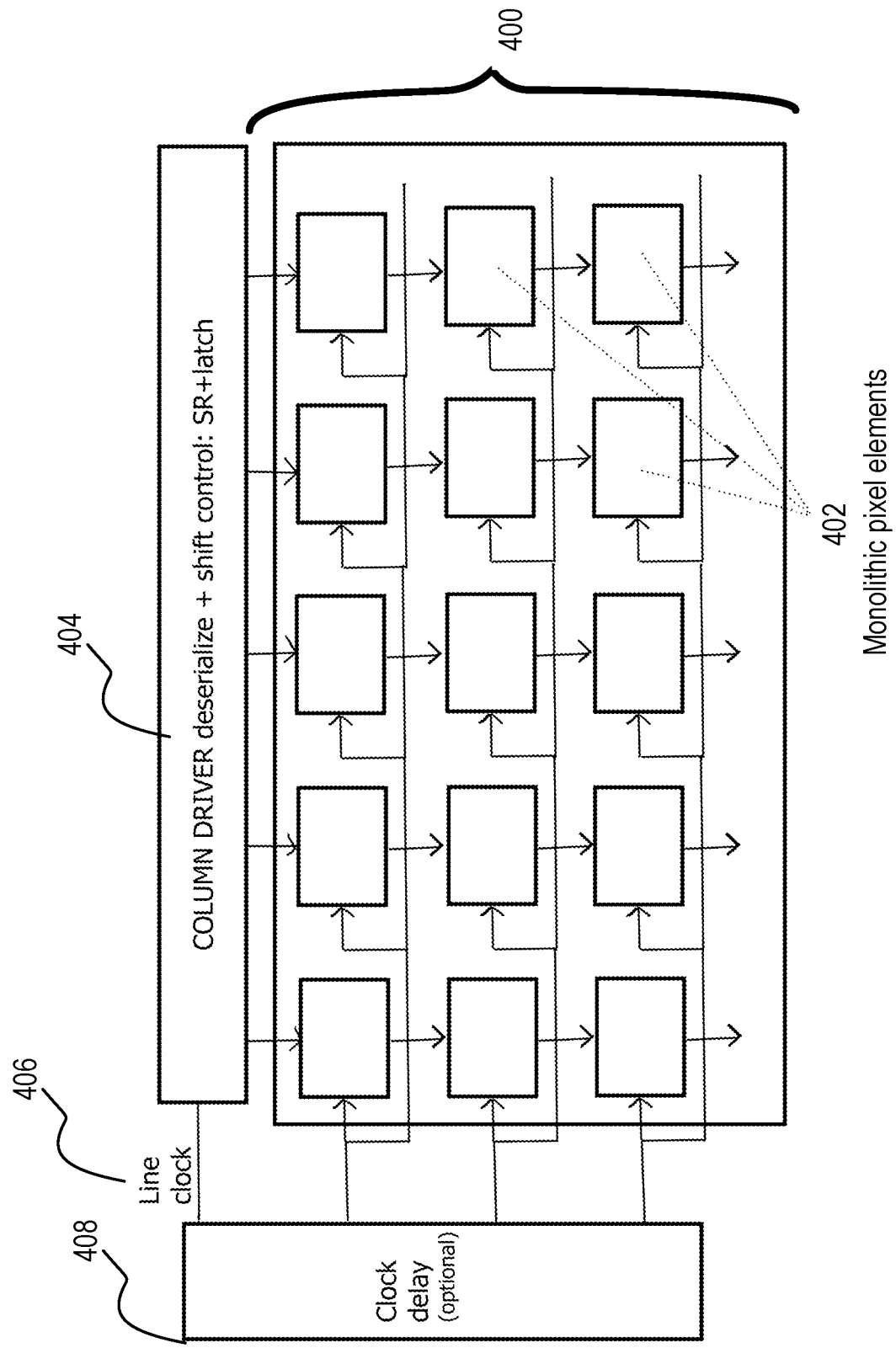
FIG. 4 depicts an exemplary pipelined LED pixel circuit topology ("pipelined topology") that can optionally be utilized in various embodiments.

The various embodiments of the present invention presented herein, as well as equivalents thereof, resolve the short-comings in the prior art and advantageously:
(a) facilitate integration of Red/Green/Blue/Other ("RGB+") native color GaN microLED epitaxy regions (202 "LED pixel arrays" in FIG. 2) onto a monolithic semiconductor substrate (204 "CMOS backplane" in FIG. 2). Each microLED element is driven by a corresponding pixel drive circuit in the CMOS backplane 204 to constitute a 402 "Monolithic pixel element" as best shown in FIG. 4;
(b) provide a compact form-factor implementation of very high-resolution displays for immersive AR;
(c) increase manufacturing yield, due to having a smaller die area compared to 2D high-resolution displays where no pixel defects are allowed; and
(d) helps average out non-uniformity of microLED efficiency/brightness because perceived pixel "on" time is distributed physically over multiple microLED rows.

Figure 1:
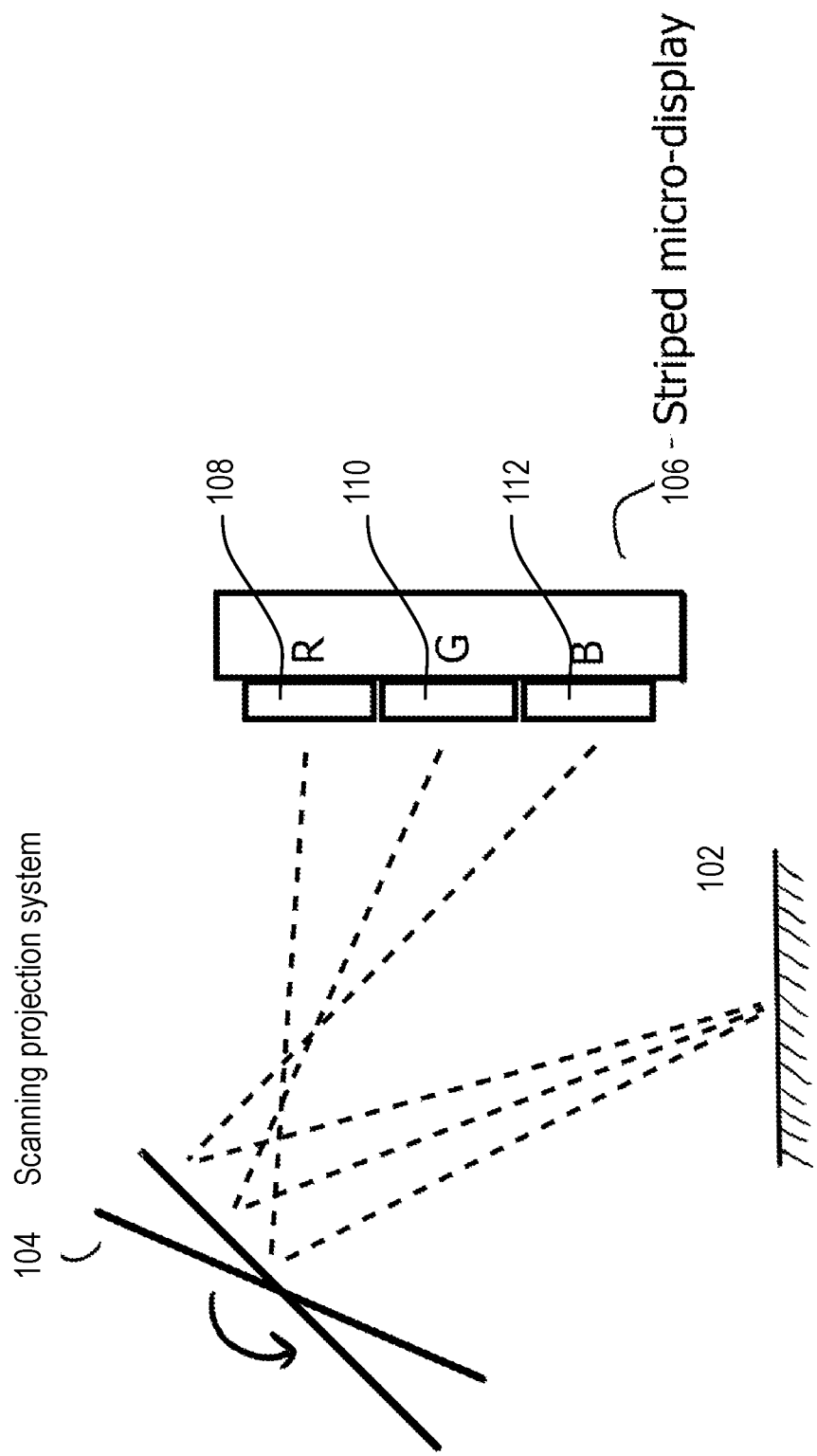
FIG. 1 illustrates an exemplary embodiment of a 1D scanning relay system.

In the various embodiments, rather than utilizing a full 2D array of RGB pixel emitters (i.e. microLEDs), as found in laptop computer displays, a 1D scanning display system is utilized. FIG. 1 illustrates an exemplary embodiment of a 1D scanning relay system. In the illustrated embodiment, the 1D scanning relay system receives a visual image from source which is then rendered on a stripped micro-display 106. The rendered image is then directed towards a relay mirror 104, and then towards a human visual system (HSV) past point 102. In such embodiments, a micro-display is organized into stripes 106 where each stripe includes one or more rows of pixels. Each stripe is utilized for one distinct color (for example, an RGB color palette). Thus, the striped microdisplay 106 includes a red stripe 108, a green stripe 110 and a blue stripe 112. Each stripe emits a time-shifted sub-band of the image, scrolling row-by-row through image lines, for example, at a line rate, such as 25 MHz as a non-limiting example. The three color stripe images are relayed by a scanning projection system 104, and combined through persistence of the human visual system (HVS) past location 102, ultimately rendering a flicker free image. To prevent overlap blurring of perceived pixels, the various embodiments may operate to limit each row's emitting time to half the line rate period, or alternatively, add a physical separation ("interstitial row") between emitter pixel rows and thereby emit for the entire line rate period instead.

Figure 2:
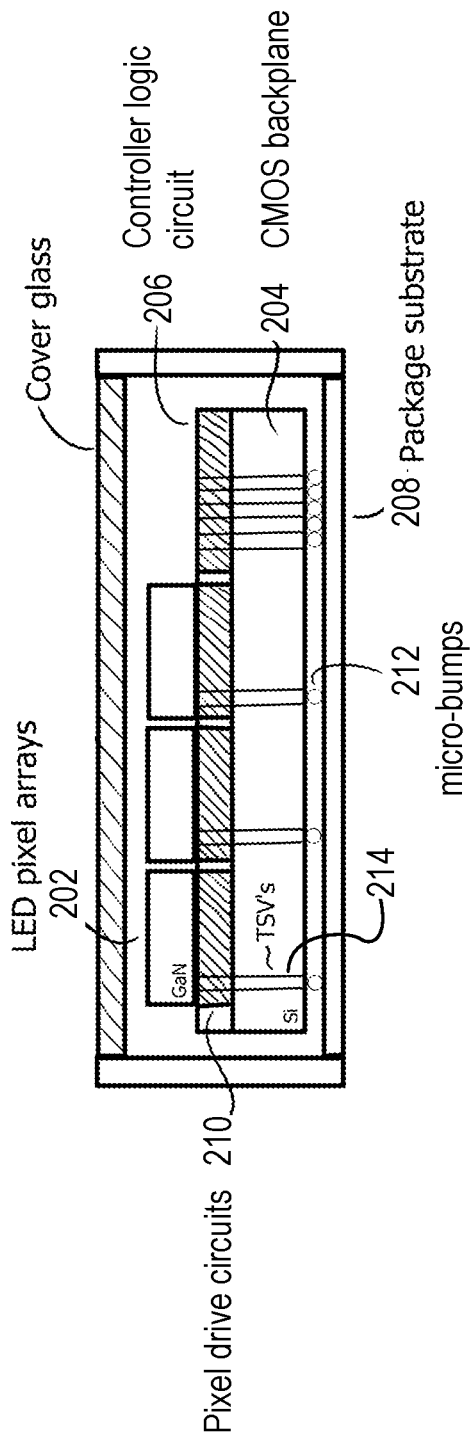
FIG. 2 illustrates a simple cross-section drawing (stack-up of pixel and pixel LED driver circuit).

FIG. 2 illustrates a simple cross-section drawing of an exemplary structure for a stack-up of pixels and pixel LED driver circuit that could be utilized in various embodiments. An LED pixel array 202, constructed of gallium arsenide LEDs as a non-limiting example, sits on a controller logic circuit 206. The controller logic circuit 206 includes pixel drive circuits 210 for controlling the LED pixel array 202. The logic circuit 206 integrated with a CMOS backplane 204 and ultimately on package substrate 208. Micro-bumps 212 and through-silicone vias (TSVs) 214 can be utilized for achieving better electrical performance and decreasing the form factor.

In a 2D display system, physical pixels typically emit light for the entire duration of the image frame to create the display. However, in the exemplary 1D scanning system that can be utilized in the various embodiments, each perceived pixel is illuminated for just a fraction of time (that is frame duration divided by the number of physical pixel rows as a non-limiting example). The human visual system perceives brightness as time integrated intensity. Thus, reduced emit duration can be compensated for by a proportional increase in instantaneous pixel drive current. The perceived pixel intensity can be increased by (a) driving the microLED with more electric current, (b) driving the microLED for a longer time period of time, or (c) by adjoining more microLED emitter devices.

Further, embodiments also may employ a novel pipelined LED pixel circuit topology. FIG. 4 depicts an exemplary pipelined LED pixel circuit topology ("pipelined topology") that can optionally be utilized in various embodiments. The exemplary pipelined topology illustrated in FIG. 4 includes an LED pixel array 400 of monolithic pixel elements 402, illustrated as a 3×5 array for illustrative purposes as those skilled in the art will appreciate that the array can be of varying sizes. The pipelined topology is illustrated as showing edge update and row scrolling PWM propagation. In the pipelined topology, pixel data transfer is organized in a "pipelined" manner where data propagates between neighboring pixels, monolithic pixel elements 402, rather than updating the pixel data of every row by a matrix column and row peripheral controller (i.e., column data and row select drivers). Advantageously, fast and smooth row scrolling is achieved while offloading processing from the peripheral row/column driver IC circuitry.

The distributed nature of circuit organization in various embodiments enables pixel grayscale intensity control and uniformity. The perceived brightness ("grayscale") of any one image pixel is the summation of light emitted by each of the rows that the image is shifted through, where the light emitted is a function of the pixel intensity and duration of each row. The total perceived intensity can be decomposed and mapped onto various circuit implementations:
a) "store-decrement" pixel circuit architecture: pixel brightness is binary (on or off, with fixed gain level) and grayscale emerges from a distributed PWM (Pulse Width Modulation). Pixel gain (scale of drive current or voltage) and global row clock periods combine into grayscale PWM intensity (sum of each row "ON" state duration multiplied by row gain).
b) "store-replicate" pixel circuit architecture: pixel brightness is full grayscale: each source pixel emits the corresponding desired grayscale intensity level, and each subsequent row pixel, replicates the same fixed intensity, propagating it, until the last pixel row in the stripe. This implementation can achieve a greater maximum brightness than the prior distributed PWM method.

The use of microLED technology in the various embodiments is advantageous in that the various embodiments can utilize a microLED switch. The microLED switch is extremely fast (nanosecond range) and includes a high brightness, high drive current, and good aging properties.

The various embodiments may achieve one or more of the various advantages described herein by utilizing one or more of the below-described architectural elements:

(a) Monochrome pixel rows (i.e. 50 rows as a non-limiting example) are utilized, one for each color (i.e. RGB, W, IR, . . . ). The image to display is "scrolled" over physical stripes at the line rate (about row clock).

(b) Each LED pixel circuit element of a stripe behaves as a memory cell and includes a microLED drive transistor, a clocked gate/latch, and optionally some basic processing functionality (comparison, decrement or increment, gain setting, clocked latching).

Figure 3:
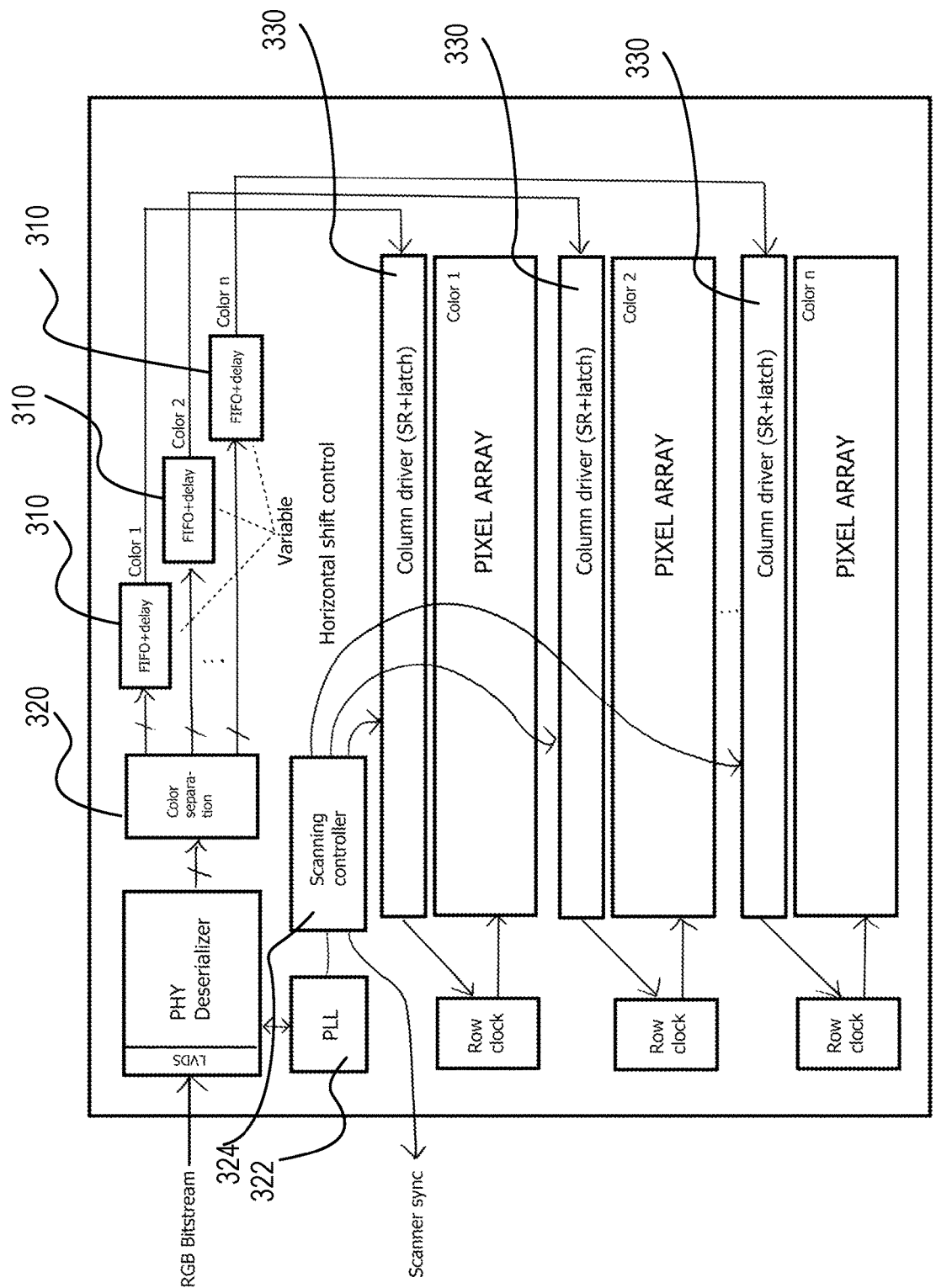
FIG. 3 is a block diagram illustrating a striped microdisplay (showing input PHY, col/row, stripes, pixels).

(c) First-In-First-Out ("FIFO") memory for temporal delay (time-shifting) to adjust for spatial separation of R/G/B color stripes for standard RGB pixel data image sources. It should be appreciated that depending upon the graphics processing unit ("GPU") rendering capabilities and implementation, the use of FIFO may be optional. Nevertheless, embodiments may keep a minimum FIFO depth for each color channel to allow for small timing adjustments throughout a full image cycle. FIG. 3 depicts an embodiment of FIFO delay memory blocks ("FIFO+delay"). The FIFO delay memory blocks 310, are illustrated as being between a common "color channel separation" block 320 and the corresponding "column driver" blocks for each color channel 330. As shown in FIG. 4, a column driver 404 performs a serial-to-parallel deserialization function and then latches pixel data to be fed into the first monolithic pixel elements in the pixel pipeline.

In some embodiments, some refinements may be utilized to compensate for the image stretching and compression throughout a full image frame cycle that are due to the acceleration and deceleration of the scanning relay projection system. The line clock (406 in FIG. 4) is at first approximation the global row clock, but may need a small percentage speed-up or slow-down throughout a full image cycle. FIG. 3 depicts a phased-locked-loop ("PLL") 322 and a "Scanning controller" 324 which orchestrate and maintain synchronization of the various system clocks with the scan mirror ("scanner sync"). In some implementations, the FIFO depth and read-out speed may be variable. The line clock may also be further optimized by introducing small variations between rows within a stripe of rows. As such, FIG. 4 depicts the "Clock delay" block 408 that optionally is used to generate the various row clocks for each row of monolithic pixel elements based on the line clock.

In various embodiments, the pixel circuit may include one or more of the following:

(a) microLED drive transistor;
(b) current mirror, a few selectable ranges;
(c) memory (i.e. 10 bit digital, analog voltage in capacitor, etc. as non-limiting examples);
(d) clocked gate/latch;
(e) optional one-time-programmable/electronically-erasable-programmable-read-only-memory ("OTP/EEPROM") bit/fuse to skip defective pixels;
(f) for "store-decrement" pixel circuit architecture, embodiments may utilize a ripple decrement circuit; and
(g) for "store-replicate" pixel circuit architecture, embodiments may utilize a voltage follower amplifier circuit for analog implementations or a digital-to-analog converter ("DAC") circuit for digital implementations.

Figure 5:
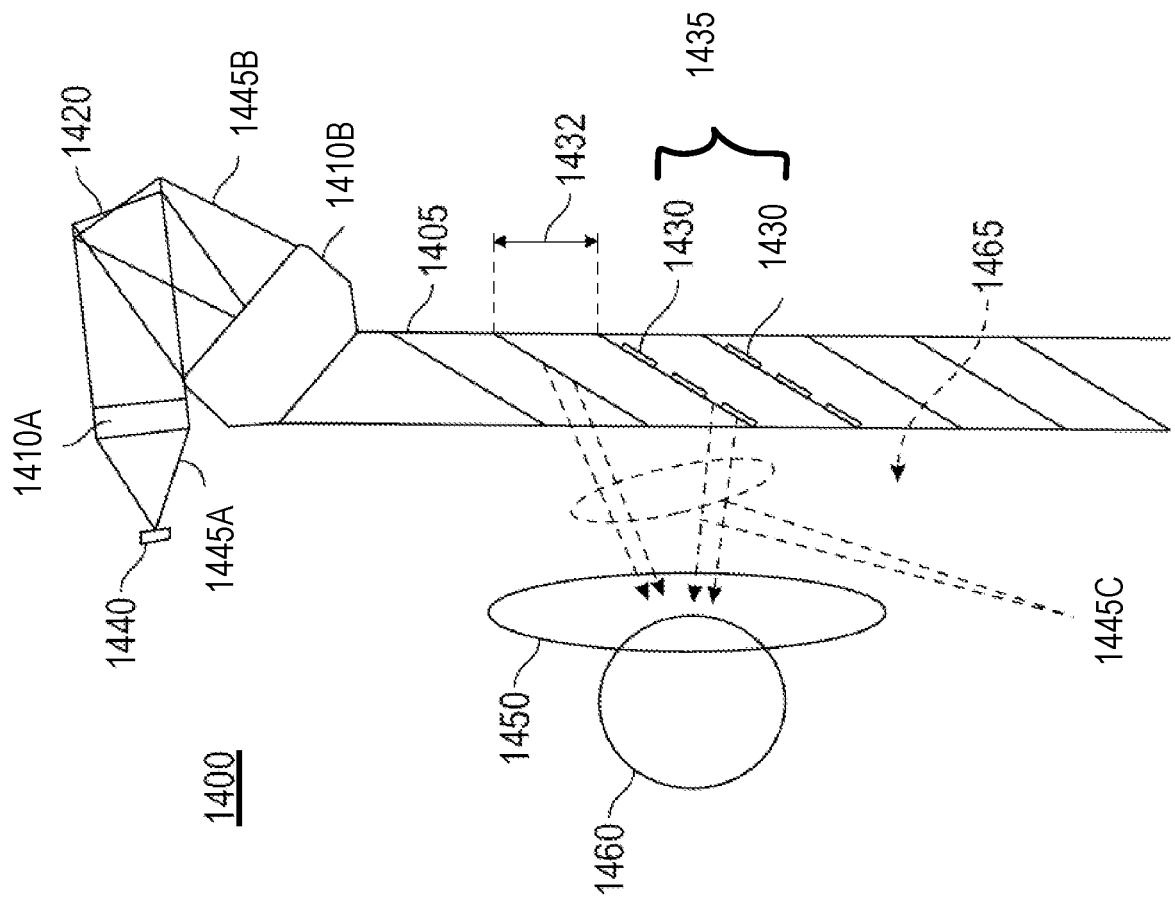
FIG. 5 depicts an embodiment for an improved light guide based AR headset having a combiner with an array of pin-mirrors.

FIG. 5 depicts an embodiment for an improved light guide based AR headset 1400 having a combiner 1405 with an array of pin-mirrors 1430. In particular, FIG. 5 depicts a line scanning AR display system that can be used for left eye or right eye viewing, in which an image source 1440 (e.g., a micro-LED array) initially provides image light 1445A, via collimation optics 1410A, a scan mirror 1420 that diverts image light 1445B through projection optics 1410B into a lightguide or combiner 1405 having pin-mirrors 1430 arranged on a plurality of pin-mirror sub-arrays 1435, such that image light 1445C is provided to an eye 1460 at an eye box 1450. Optics 1410A can be refraction, diffraction, reflection, or electrical-controlled diffraction based, or combinations thereof. The visor or lightguide combiner 1405 can also be shaped and contoured to improve the fit to a viewer's face.

Figure 6:
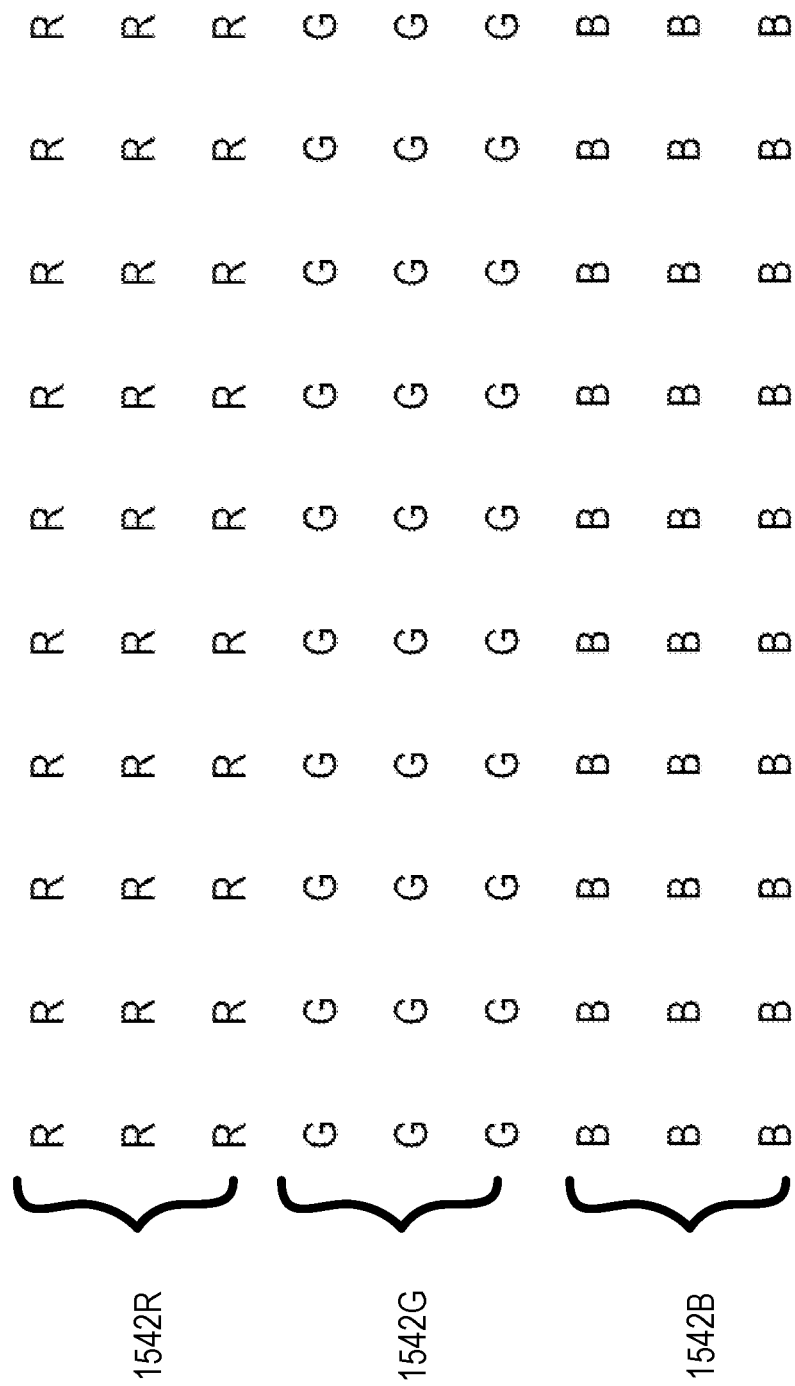
FIG. 6 depicts a portion of an LED array device with an arrangement of LED pixels as three linear areas or blocks such that a parallel linear array of Red (R) pixels is adjacent to a parallel linear array of Green (G) pixels, that is adjacent to a parallel linear array of Blue (B) pixels.

It is noted that at present, it can be difficult to fabricate and source small, bright 2D micro-LED arrays 1440 with tightly packed addressable RGB image pixels. As an alternative, a tri-linear RGB LED array light source can be used (see element 1540 in FIG. 6). For example, the LED array source can be a true 1D tri-linear array that provides a line of addressable LED pixels having 1×4096 red light emitting pixels, parallel to a similar respective rows of green light and blue light emitting pixels. Alternately, as shown in FIG. 6, the image source 1540 can be a device that can be described as a 2D micro-LED array or block-width tri-linear micro-LED array. In particular, FIG. 6 depicts a portion of an LED array device with an arrangement of LED pixels as three linear areas or blocks such that a parallel linear array of Red (R) pixels 1542R is adjacent to a parallel linear array of Green (G) pixels 1542G, that is adjacent to a parallel linear array of Blue (B) pixels 1542B. For example, each block or linear array of pixels, whether R, G, or B, can comprise 50×8000 pixels. The LED emitters in a given line (e.g., 50 pixels wide) are individually addressed and controlled, and at any point in time, during scanning and image display, they can be providing an intensity of image light for different details of the displayed AR image content. This second approach, with a block-width tri-linear micro-LED array, enables embodiments of an AR headset ("ARHS") to provide a brighter image.

Within a linear micro-LED array light source 1540, individual light emitting pixels 1542R, 1542G and 1542B (collectively referred to as 1542) can also be square or rectangular in aspect ratio. As an example, an individual light emitting pixel, whether R, G, or B can have a nominal side dimensions of 2.5-5.0 microns width, although the pixels can be smaller (1.0 microns wide as a non-limiting example) or larger. Each block or linear array of pixels, whether R, G, or B, can 8000 pixels long by 50 pixels wide. Thus, for example, with 3.2 micron square pixels, each of the respective color arrays would be 160 microns wide, and 25.6 mm long, to provide an overall linear type device or image source 1540 that is ~0.5 mm wide and 25.6 mm long. The linear arrays of RGB image pixels 1542A, 1542G and 1542G in FIG. 6 can be provided with other arrangements of the colors, such R, B, G, and the number and size of image pixels need not be identical from one color array to another. The LED array can also be equipped with micro-optics, such as a lenslet array (not shown), to help with beam shaping. For example, a custom designed micro-lens array, aligned and mounted to collect and redirect light from the LED pixels, can have lenslets with customized shapes, or optical designs that are spatially variant across the LED array or by color (R, G, B). Although FIG. 6 depicts the tri-linear LED array (1540) as a straight linear RGB device, the device can also be a white light, or monochrome or single-color device, or be curved (along an arc) or shaped. Curving or shaping the array can better match an eyepiece (combiner 1405) in a way that is more conformal to the human facial structure, and increase apparent light efficiency to a viewer.

In either case, a tri-linear micro-LED array 1540 with LED pixels 1542, whether RGB or other configuration) can be used as an image source 1540 for the improved AR headset 1400 of FIG. 5. The emitted image light is shaped by collimation optics (1410A) and directed onto a 1D scanning micro-mirror 1420, through projection optics (1410B), and into a combiner 1405 or eyepiece, to then transit the combiner and be directed to the eye box 1450. As shown, this combiner has multiple sub-arrays (1435) of pin-mirrors 1430. This system can provide high brightness AR images to a viewer simultaneously along with the presence of high brightness ambient light 1465. The 1D, 2D or customized scanning system could be provided using a variety of mechanisms, devices, materials, or modulation components, including but not limited to, microelectromechanical systems ("MEMS") devices, solid state displays, spatial light modulators (e.g., back illuminated liquid crystal (LC) devices), modulation crystals, or beam deflectors.

Operationally, the individual R, G, or B LED pixels 1542 can provide emitted light with 8-10 bits of modulation depth, at a display frequency of 30-120 Hz, depending on the application and specifications. Both the modulation bit depth and display frequency can be increased (e.g., to 12-14 bits, and 144-200 Hz, respectively) depending on the available technologies and the value to the ARHS product. This modulated image light 1445A is then directed through optics 1410A to a linear scan mirror 1420, which can be driven by a controller (not shown). The scan mirror 1420 can be either a resonant or non-resonant scanner, with its scan operation calibrated by a line scan position monitoring sensor (not shown). FIG. 5 depicts two tilt positions for this scan mirror, with opposite tilts. Scan mirror 1420 can be a MEMs device, for example that is a single mirror with an active mirror 2.5 mm wide and 6 mm long, where the mirror tilts by ±7-10 degrees about the width direction. Improved or optimized devices with either smaller or larger (e.g., ±12o) scan angles can also be used. The optical scan range (angle) is 2× the mechanical scan range (angle). The scan mirror 1420, which can also be designed as a linear array of multiple mirrors, can be provided by vendors such as Preciseley Microtechnology Corp. (Edmonton AB, CA) or Fraunhofer IPMS (Dresden, DE). Scan mirror 1420 can also be enabled by other technologies, such as a piezoelectric device (e.g., using PLZT) or a galvanometer. As the scan mirror 1420 tilts, the image light 1445B is swept through the light guide combiner 1405, to reflect light off of pin-mirrors 1430, and direct light 1445C to an eye box 1450. Image light 1445A can be provided by the LED pixels 1440, in synchronization with the scan mirror 1420 tilt, such that image light 1445C is directed into the eye box 1450 for an extended duration per sweep. As image content can be provided for both directions of scan mirror tilting, the effective operational scanning duty cycle can be high (e.g., ~90%).

A preferred configuration for this system is to provide the image source 1440, associated optics, and scan mirror 1420, at the top, above the eyes, so image light 1445A and 1445B is directed from the forehead downwards into the combiner 1405. As previously described, a variety of pin-mirror parameters, such as a maximum and minimum size, a pitch or gap between them, and target fill factors can be defined. Then, during optimization, the pitch, size, shape, curvature, tilt, positioning, fill-factors, coatings, and other parameters related the pin-mirrors 1430 and the pin-mirror sub-arrays 1435, including the sub-array pitch 1432, within the combiner 1405 can be optimized. As an example, the 1D scanning AR display system 1400 of FIG. 5 can use an array of pin-mirrors 1430 in which the pin-mirrors have ~0.4-1.2 mm widths, and are spaced apart from one another by a spatially variant pitch (1432) in the ~2-5 mm range, and combiner 1405 can have a total of 300-1000 pin-mirrors 1430 distributed across one or more imbedded pin-mirror sub-arrays 1435. But depending on the design optimization of the pin-mirror based combiner or eye piece 1405, the number of pin-mirrors can be ≤50, or ≥2000, or somewhere in between. The optimization of the configurations of the individual pin-mirrors in the various embodiments and the pin-mirror sub-arrays in the various embodiments, relative to pin-mirror design parameters such as number, size, pitch, curvature, and coatings, and system parameters such as the target headset field of view ("FOV") (e.g., a wide FOV ("WFOV")≥90o per eye), can be motivated by many factors or performance metrics, including the lack of visible moiré, the apparent headset transparency for the ambient light, and the apparent brightness for display expected light. Other optimization or performance metrics can include factors that are specific to a given viewer application or to the manufacturability of the pin-mirrors and pin-mirror arrays. A pin-mirror optimization method can also be a subset of a larger optimization method that includes the design of the entire combiner, or the entire AR headset, including the design of the imaging optics, housings, and various light trapping or light absorbing features.

As shown in FIG. 5, the combiner 1405 used in the improved scanning and light guide based AR headset 1400, which can be straight or curved, can be of the type with multiple planes of parallel sub-arrays of pin-mirrors 1430. The combiner can have curvature or shaping to help conform to the shape of a viewer's face, and curvature can be provided only outside the area used for image display, or it can extend to within the viewed area. The AR headset 1400 of FIG. 5 can also be provided with pin-mirror based combiners that are of the type with a single laterally spread pin-mirror array using a single light guide, or of the type with dual parallel light guides and a curved reflector (970) at the bottom of the eyepiece, opposite the top side image source.

The 1D scanning, pin-mirror based, AR headset 1400 of FIG. 5 also can be advantageously adjusted for variations in interpupillary distance (IPD) amongst viewers. As an example, the device can be designed so that nominally only 6000 pixels of an available 8000 pixels of an image source array (1440) are used at a given time. But the stripe of used pixels can be selected to shift the images provided by the left eye and right eye scanning displays, to the left or right, so as to adjust for different people's interpupillary distance. This capability can be enabled by a calibration set-up process or with eye tracking.

In the forgoing description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the word circuitry is used to describe a functional element. Any functional element described as circuitry may include hardware, software, r firmware or any combination thereof. Hardware may consist of discrete components, integrated circuits, one or more substrates, hybrids, or the like.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. An apparatus comprising:
    a tri-linear microdisplay comprising a plurality of display pixels that define one or more stripes, wherein each of the one or more stripes comprises a plurality of rows of pixels of the plurality of display pixels;
    a display driver including a data register configured to:
        drive the plurality of display pixels of the tri-linear microdisplay to present one or more sub-bands of a particular image on one or more of the on or more stripes of the tri-linear microdisplay; and
        scroll image lines of an image through the plurality of display pixels of the one or more stripes by loading image data of the image into the data register and the data register feeding the image data through each of the one or more stripes row by row;
    whereby the apparatus is used in a 1D-scanning display system to create high-resolution images in an augmented reality ("AR") or Head Mounted Display;
    wherein the display driver is configured to achieve a pixel illumination by shifting the particular image through multiple rows such that the resulting perceived pixel illumination is the sum of the pixel intensities from the corresponding pixels in each row.

2. The apparatus of claim 1, wherein one or more of the sub-bands are time-shifted.

3. The apparatus of claim 1, wherein the display driver is further configured to utilize a pipeline data update architecture in which data for each of the plurality of display pixels in the tri-linear microdisplay propagates from an adjacent pixel in a neighboring row and operates to drive the plurality of rows of pixels of the plurality of display pixels within a stripe.

4. The apparatus of claim 1, wherein the display driver utilizes one or more first in first out ("FIFO") memory blocks to create the one or more time-shifted sub-bands of the particular image for the one or more stripes.

5. The apparatus of claim 1, wherein a pixel intensity modulation is achieved by a distributed pulse width modulation ("PWM") method wherein each row is driven with a fixed gain level and a row clock, and wherein pixel data is updated by decrementing and propagating to an adjacent row.

6. The apparatus of claim 1, wherein a pixel intensity modulation is achieved by driving each pixel proportional to a desired intensity value, and pixel data is updated by propagating the desired intensity value to an adjacent row.

7. The apparatus of claim 1, wherein a pixel intensity modulation is achieved by driving each pixel with a pulse width proportional to a desired intensity value, and pixel data is updated by propagating a related intensity value to the adjacent row.

8. The apparatus of claim 1, wherein the display driver is further configured to reduce an effect of physical LED non-uniformity by illuminating certain pixels in multiple rows at an appropriate time such that the illumination of each certain pixel sums to create an aggregate brightness of an individual display pixel.

9. The apparatus of claim 1, in which pixel driver circuits within the display driver are configured to reduce the effect of 1D-scanner motion pixel blur by illuminating each row for less than 100% of an image row display time.

10. The apparatus of claim 1, in which pixel driver circuits within the display driver comprise a fast switch capable of a high drive current and constructed such that a performance characteristic of the fast switch will not degrade over a useful life of the AR or Head Mounted Display.

11. The apparatus of claim 1, wherein the display driver comprises one or more of:
    (a) a microLED drive transistor,
    (b) a current mirror,
    (c) a digital memory,
    (d) a digital latch,
    (e) a one-time programmable ("OTP") or electronically erasable programmable read only memory ("EEPROM"),
    (f) a programmable fuse,
    (g) a ripple decrement circuit,
    (h) a voltage follower amplifier,
    (i) a digital-to-analog ("DAC"), and
    (j) a comparator.

12. The apparatus of claim 1, wherein the display driver comprises an adjustable row clock timer such that the display driver can adjust a timing to compensate for non-linearities in a scanner deflection trajectory of an optical scanner an/or an optical system.

13. The apparatus of claim 1, wherein the display driver further comprises a pixel illumination circuit and/or a row update circuit that are synchronized to a position of an optical scanner.

14. The apparatus of claim 1, wherein the display driver is further configured to cause the particular image to shift locations across a physical array of pixels to align to an interpupillary distance ("IPD") of a current user.

15. A method to create high-resolution images in an augmented reality ("AR") or Head Mounted Display, the method comprising:
    employing a display driver configured to drive a plurality of display pixels of a tri-linear microdisplay, wherein the tri-linear microdisplay defines one or more stripes, and wherein each of the one or more stripes comprises a plurality of rows of pixels and is used in a 1D-scanning display system;
    load image data into a data register;
    present one or more sub-bands of a particular image on one or more of the plurality of stripes of the tri-linear microdisplay; and
    scroll image lines of the particular image through the plurality of display pixels of the one or more stripes by causing the data register to feed the image data through each of the one or more stripes row by row;
    whereby the apparatus is used in the 1D-scanning display system to create high-resolution images in an augmented reality ("AR") or Head Mounted Display;
    further comprising configuring the display driver to achieve a pixel illumination by shifting a particular image through multiple rows such that a resulting pixel illumination is a sum of pixel intensities from corresponding pixels in each row.

16. The method of claim 15, further comprising utilizing a first in first out ("FIFO") memory block in the display driver to create the one or more time-shifted sub-bands of the particular image for the one or more stripes.

17. The method of claim 15, further comprising configuring the display driver to utilize a pipeline data update architecture in which data or each of the plurality of display pixels in the tri-linear microdisplay apparatus propagates from an adjacent pixel in a neighboring row and operates to drive the plurality of rows of pixels of the plurality of display pixels within a stripe.

18. The method of claim 15, further comprising achieving a pixel intensity modulation by a distributed pulse width modulation ("PWM") device driving each row with a fixed gain level and a row clock, and updating pixel data by decrementing and propagating to an adjacent row.

19. The method of claim 15, further comprising achieving a pixel intensity modulation by driving each pixel proportional to a desired intensity value, and updating pixel data by propagating the desired intensity value to an adjacent row.

20. The method of claim 15, further comprising achieving a pixel intensity modulation by driving each pixel with a pulse width proportional to a desired intensity value, and updating pixel data by propagating a related intensity value to the adjacent row.

21. The method of claim 15, further comprising configuring the display driver to reduce an effect of physical LED non-uniformity by illuminating certain pixels in multiple rows at an appropriate time such that the illumination of each certain pixel sums to create an aggregate brightness of an individual display pixel.

22. The method of claim 15, further comprising reducing the effect of 1D-scanner motion pixel blur by illuminating each row for less than 100% of an image row display time.

23. The method of claim 15, further comprising a fast switch within the display driver, wherein the fast switch is capable of a high drive current and constructed such that a performance characteristics of the fast switch will not degrade over a useful life of the AR or head mounted display.

24. The method of claim 15, further comprising configuring the display driver to comprise one or more of:
(a) a microLED drive transistor,
(b) a current mirror,
(c) a digital memory,
(d) a digital latch,
(e) a one-time programmable ("OTP") or electronically erasable programmable read only memory ("EEPROM"),
(f) a programmable fuse,
(g) a ripple decrement circuit,
(h) a voltage follower amplifier,
(i) a digital-to-analog ("DAC"), and
(j) a comparator.

25. The method of claim 15, further comprising employing a row clock timer within the display driver and utilizing the row clock timer to adjust a timing to compensate for non-linearities in a scanner deflection trajectory of an optical scanner and/or an optical system.

26. The method of claim 15, further comprising employing a pixel illumination circuit and/or a row update circuit within the display driver and synchronizing with a position of a mirror scanner.

27. The method of claim 15, further comprising configuring the display driver to cause a particular image to shift locations across a physical array of pixels to align to an interpupillary distance ("IPD") of a current user.

* * * * *